United States Patent [19]

Revere, Jr.

[11] Patent Number: 4,682,392
[45] Date of Patent: Jul. 28, 1987

[54] ANVIL INSERT FOR FASTENER MACHINE
[75] Inventor: William G. Revere, Jr., Atlanta, Ga.
[73] Assignee: Lockheed Corporation, Calabasas, Calif.
[21] Appl. No.: 779,371
[22] Filed: Sep. 23, 1985
[51] Int. Cl.⁴ .................................. B23B 11/00
[52] U.S. Cl. .................. 29/34 B; 29/243.53; 408/30
[58] Field of Search ............... 29/26 A, 34 B, 243.53, 29/283; 72/478, 481; 83/658, 698; 408/30

[56] References Cited
U.S. PATENT DOCUMENTS

| | | | |
|---|---|---|---|
| 2,627,771 | 2/1953 | Phillips et al. | 72/478 |
| 3,030,695 | 4/1962 | White et al. | 29/34 B |
| 3,456,483 | 7/1969 | Crothers et al. | 72/478 |
| 4,377,085 | 3/1983 | McDermott et al. | 72/478 X |
| 4,530,229 | 7/1985 | Walker | 72/478 X |

Primary Examiner—Robert L. Spruill
Assistant Examiner—Steven P. Weihrouch
Attorney, Agent, or Firm—Eric R. Katz; Stanley L. Tate

[57] ABSTRACT

An improved apparatus for drilling, countersinking, inserting and forming the head of a rivet in a workpiece comprising a base which holds a lower anvil assembly in correct linear relationship with an upper ram assembly; a lower anvil body mounted on the base and a removable anvil insert having a common long axis with the anvil body, the upper ram assembly, and the rivet on which a head is being formed.

6 Claims, 2 Drawing Figures

ANVIL INSERT FOR FASTENER MACHINE

TECHNICAL FIELD

This invention generally relates to apparatus for continuously and automatically drilling and countersinking a hole in a workpiece, inserting a rivet in the hole and squeezing the rivet to form a head.

BACKGROUND ART

Automatic fastener machines can drill, countersink, insert and squeeze a rivet in a workpiece in approximately 3.5 seconds when average materials are being joined. Such machines generally automatically gauge the depth of the countersink and determine the height, or upset, of the formed head. The height of the upset is determined from the bottom of the workpiece. Head formation and workpiece support is accomplished by the lower anvil assembly of the fastener machine. The determination of head height and proper workpiece support requires that the lower anvil assembly be positioned directly below the upper ram of the fastener machine because the upper ram performs the functions of drilling, countersinking and inserting the rivet into a hole.

Because the lower anvil body must be closely positioned to the upper ram the anvil can be easily damaged either by a drill during the drilling function or because of some misalignment or because a rivet may be harder than specification. In the past when the lower anvil was damaged, several hours were required to disassemble the fastener machine, replace the damaged anvil and reassemble and align the machine so that work could be resumed. Not only was the repair procedure time consuming, resulting in loss of substantial amounts of production time, it was also expensive because replacement anvils are costly, and for the most part, almost impossible to repair.

DISCLOSURE OF THE INVENTION

Accordingly, it is an object of the present invention to provide an anvil assembly that can be easily and economically repaired without causing substantial loss of production time.

Another object of the present invention is to provide an anvil assembly that can be easily and economically repaired and usually does not require realignment with the upper ram of the fastener machine before production is resumed.

A principal feature of the present invention is the provision of a unique lower anvil assembly for automatic fastener machines. In accordance with the present invention, a lower anvil assembly is provided for forming heads on rivets, gauging the proper head height and supporting the workpiece during drilling and countersinking. The lower anvil assembly generally comprises a base for holding a lower anvil body in a fixed relationship with the upper ram of the fastener machine; a segmented lower anvil body made up of a substantially cylindrical anvil body which functions with a hydraulic sleeve and plunger and a removable anvil insert which can be removed from the anvil body for repair or replacement without disturbing the linear relationship between the lower anvil assembly and the upper ram.

It is another feature of the present invention to provide a lower anvil assembly which can generally be repaired for about one tenth the cost of repairing prior art anvils.

Still another feature of the present invention is to provide a lower anvil assembly which can be repaired in about one-twelfth the time usually required to repair a prior art lower anvil.

In accordance with the present invention, the removable anvil insert generally comprises an elongated rod adapted to thread into said lower anvil body and be easily removed when damaged.

In accordance with these and other objects, features and advantages of the present invention, there is provided a base for holding a lower anvil body in a fixed relationship with the upper ram assembly of a fastener machine; a lower anvil body mounted on the base and adapted to receive an anvil insert means in a fixed relationship with the upper ram and anvil insert means having a longitudinal axis that coincides with the longitudinal axis of the upper ram assembly so that the drilling, countersinking, inserting and head formation functions of the fastener machine are performed along the common long axis of the upper ram assembly and the lower anvil.

These and other objects, features and advantages of the present invention will become more readily apparent with a reading of the following more detailed description of the preferred embodiment in conjunction with the accompanying drawings and claims. The drawings in which like reference characters indicate corresponding parts in all views are not necessarily to scale, emphasis instead being placed on illustrating the principles of the invention.

BEST MODE OF CARRYING OUT THE INVENTION

Figure 1:
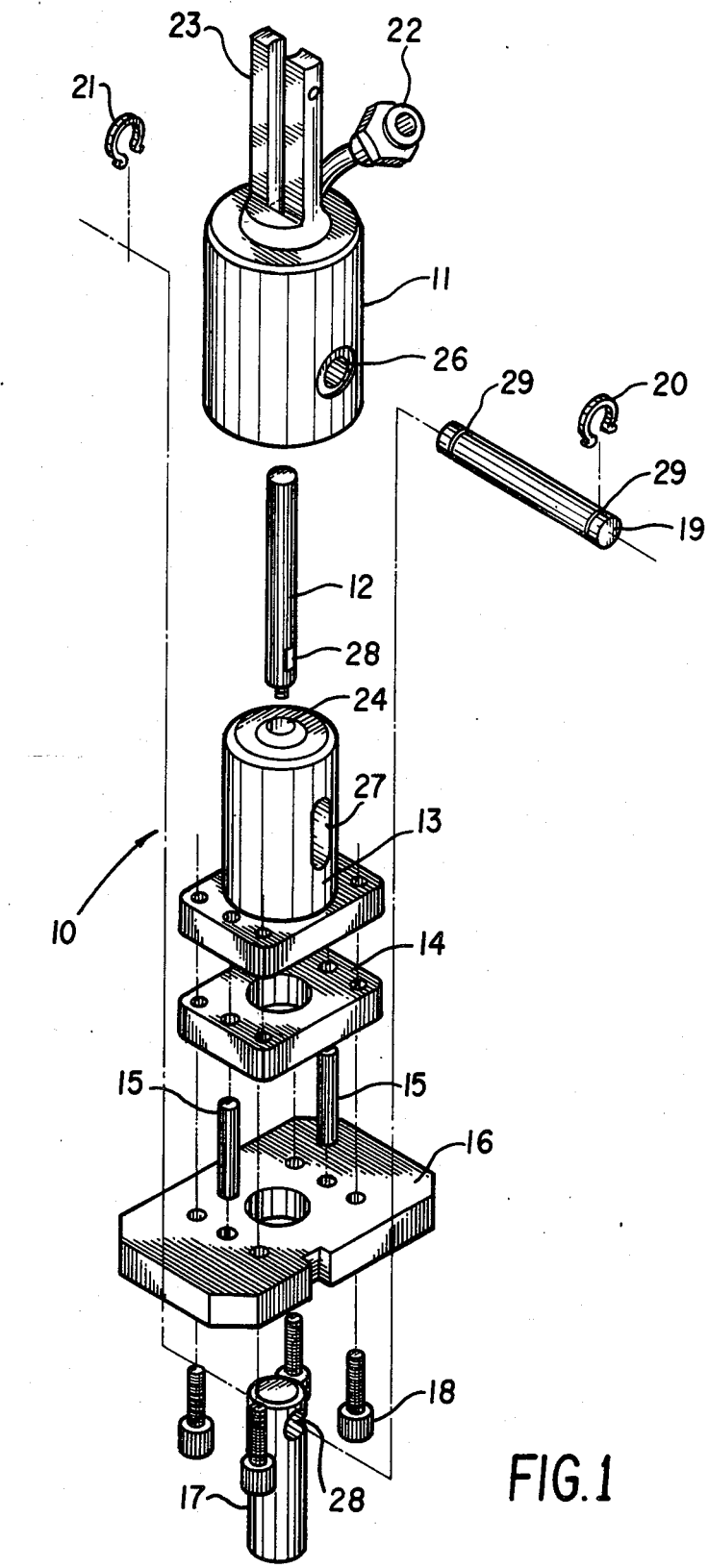
FIG. 1 is an exploded assembly view of the lower anvil assembly of the present invention.

Referring now to FIG. 1 in which the lower anvil assembly 10 is shown in an exploded view. Lower anvil assembly 10 generally comprises pressure sleeve 11, lower anvil insert 12, lower anvil body 13, spacer 14, dowel pins 15, base 16, plunger 17, fasteners 18, pin 19, retaining rings 20 and 21, hydraulic fitting 22, and pressure foot 23. Pressure sleeve 11 serves as a guide for lower anvil insert 12 and as a means for assembling various components of the lower anvil assembly. Lower anvil insert 12 mounts on lower anvil body 13 by threading into lower anvil insert holder 24. Flats 25 are provided for wrenching lower anvil insert 12 tightly into holder 24. Lower anvil body 13 also serves as the power unit to move the lower anvil insert 12 up and down during the riveting operation. Spacer 14 serves as a means for properly positioning the lower anvil body 13 on base 16 and as a means to achieve a proper relationship between plunger 17 and the lower anvil body 13.

Figure 2:
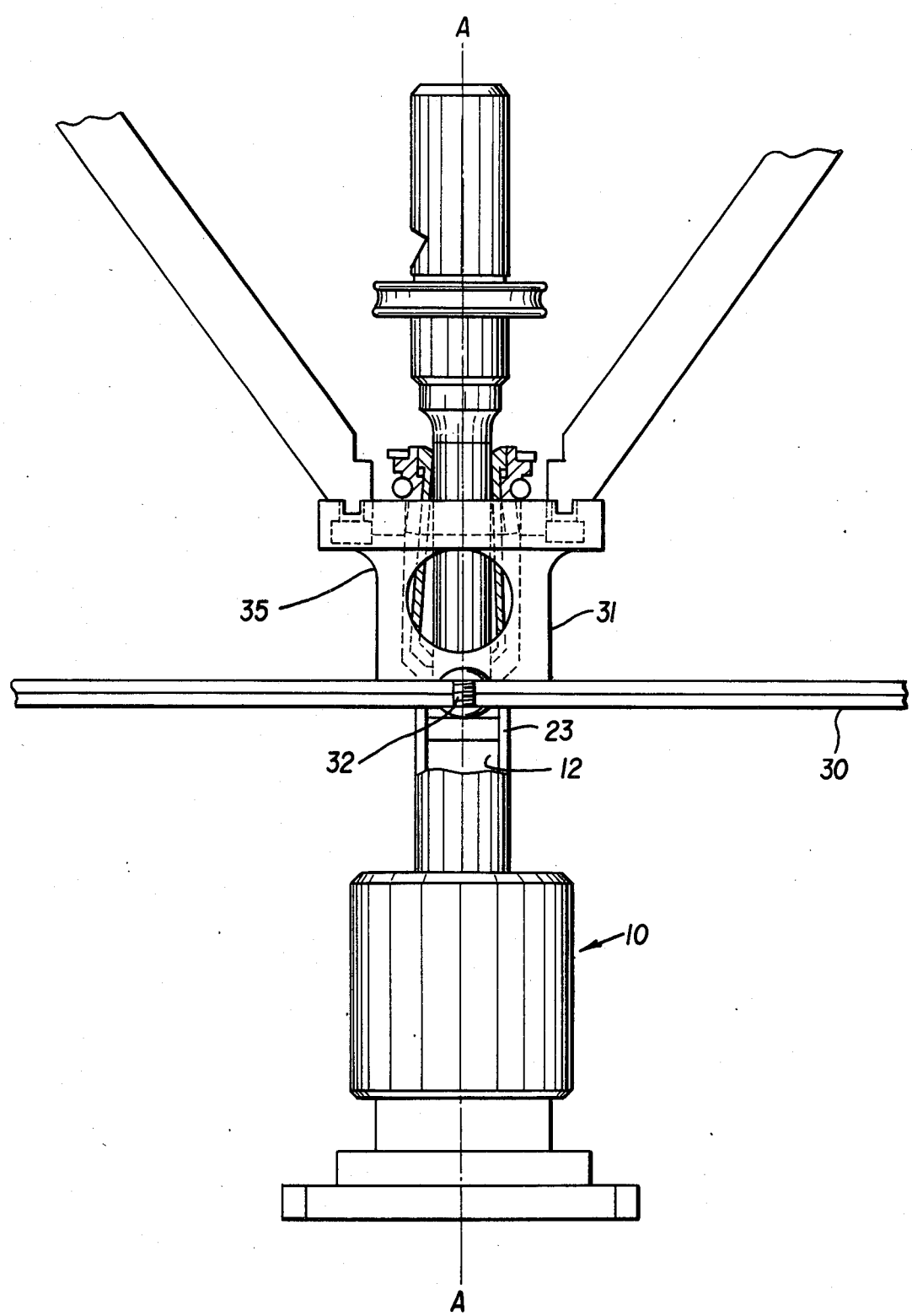
FIG. 2 is a partial cross section of an upper ram assembly and a lower anvil assembly showing the relationship of the components of an automatic fastener machine.

In operation, when the drilling process begins, lower ram assembly 10 raises lower anvil body 13 and lower anvil insert 12 until pressure foot 23 presses against the workpiece 30 forcing it against stationary pressure foot 31, FIG. 2. While thus held, the workpiece 30 is drilled and countersunk. When the drilling and countersinking operation is complete, rivet 32 is inserted into the hole where it is locked in position by the upper ram assembly and held in position for head formation from below by the lower anvil insert 12 which is pushed forward as plunger 17 applies pressure to lower anvil body 13. Pressure sleeve 11, lower anvil body 13 and insert 12 are held in this assembled and functional relationship by pin 19 which passes through pin channel 26 on opposite sides of pressure sleeve 11, elongated pin channel 27 on opposite sides of lower anvil body 13 and plunger pin channel 28 in plunger 17. Pin 19, when properly positioned, is held in place by retaining rings 20 and 21 which snap into retaining ring grooves 29 near each end of pin 19. Because lower anvil insert 12 can be removed from lower anvil body 13 without disturbing the relationship of lower anvil body 13 with respect to upper ram assembly 35 with respect to center line A—A it is possible to remove and replace a damaged lower anvil insert 12 in a matter of minutes. This operation is speeded up because no time-consuming optical alignment of the lower anvil insert with the upper ram 35 is required as could be the case if the prior art solid piece which comprised both the lower anvil body and lower anvil were required to be replaced.

Although the present invention has been discussed and described with primary emphasis on one preferred embodiment, it should be obvious that adaptations and modifications can be made thereto without departing from the spirit and scope of the invention.

I claim:

1. In an apparatus for drilling, countersinking, inserting and forming the head of a rivet in a workpiece, said apparatus comprising an upper ram assembly for holding a workpiece, drilling and countersinking holes in said workpiece and inserting rivets therein for head formation and a lower anvil assembly for holding the workpiece and forming the head on a rivet inserted in said hole by said upper ram assembly, the cooperative function of said upper arm assembly and said lower ram assembly requiring that the drilling, countersinking, inserting and head forming functions be performed along a common longitudinal axis, the improvement comprising:
   (a) a base for holding a lower anvil body in a fixed relationship with said upper ram assembly;
   (b) anvil insert means having a longitudinal axis that is common with the longitudinal axis of the upper ram assembly so that drilling, countersinking, inserting and head formation functions of said apparatus are performed along said longitudinal axis; and
   (c) a lower anvil body mounted on said base and adapted to receive an anvil insert means and hold said anvil insert means in a fixed relationship with said upper ram assembly, said lower anvil body comprising a substantially cylindrical body having an inner bore adapted to receive a plunger for movement therein, said body having a mounting flange on one end for attaching the body to said base and on the opposite end a means for attaching said anvil insert means to said anvil body.

2. The apparatus of claim 1, wherein said anvil body is adapted to receive about its outer surface a concentric pressure sleeve, said pressure sleeve being capable of reciprocal motion along the length of said anvil body responsive to similar motion of said plunger within the central bore of said anvil body.

3. The apparatus of claim 2, wherein said pressure sleeve further includes an elongated pressure foot concentric to the long axis of said anvil body, said elongated pressure foot being adapted to permit reciprocal motion of said anvil insert means along a channel cut therein whereby said pressure foot may be brought into contact with a workpiece as said insert means moves along said channel to contact a rivet and form a head on same.

4. The apparatus of claim 2, further including means for interconnecting said pressure sleeve, said anvil body, and said plunger whereby said pressure sleeve and said anvil body move in response to motion by said plunger through the inner bore of said anvil body.

5. The apparatus of claim 2, wherein said means for attaching said anvil insert means to said anvil body comprises a threaded hole, the center line of which is the long axis of the anvil body so that when attached to the anvil body, said anvil insert means is aligned with a rivet positioned in the hole in the workpiece.

6. The apparatus of claim 5, wherein said anvil insert means comprises a cylindrical rod threaded on one end for threading into the threaded hole in said anvil body and is shaped on the other end to contact a rivet and form a head thereon.

* * * * *